United States Patent [19]

Pegler et al.

[11] 4,122,598
[45] Oct. 31, 1978

[54] TOOL CHANGER

[75] Inventors: Frederick E. W. Pegler, Orchard Park, N.Y.; Howard H. Laucks, St. Petersburg, Fla.

[73] Assignee: Moog Inc., East Aurora, N.Y.

[21] Appl. No.: 803,120

[22] Filed: Jun. 3, 1977

[51] Int. Cl.² .......................................... B23Q 3/157
[52] U.S. Cl. ..................................... 29/568; 29/26 A
[58] Field of Search ................. 29/26 A, 568; 408/35

[56] References Cited

U.S. PATENT DOCUMENTS

| Re. 26,827 | 3/1970 | Swanson et al. | 29/568 X |
|---|---|---|---|
| 3,526,033 | 9/1970 | Saunders | 29/568 |
| 4,020,545 | 5/1977 | Slavinski et al. | 29/568 |

Primary Examiner—Gil Weidenfeld
Attorney, Agent, or Firm—Sommer & Sommer

[57] ABSTRACT

A tool changer is adapted to be mounted on a machine tool having a spindle rotatable about a vertical axis. The tool changer includes a rail adapted to be mounted on the machine tool, a carriage mounted on the rail for movement toward and away from the spindle axis, a carousel-type tool storage magazine mounted on the carriage for movement therewith and also mounted for rotational movement about a vertical axis, a Geneva mechanism selectively operable to rotatably index the carousel, and a mechanism for selectively moving the carousel toward and away from the spindle axis. The carousel includes a plurality of hands spaced thereabout and mounted for independent vertical movement between a lowered position and a raised position. The carousel also includes a mechanism for selectively lifting any one of such hands which is aligned with the sindle. Each of the hands supports a cooperative pair of outwardly extending fingers adapted to embrace and releasably hold a tool holder therebetween.

7 Claims, 22 Drawing Figures

TOOL CHANGER

BACKGROUND OF THE INVENTION

1. Field of the Invention

The present invention relates generally to apparatus for changing tool holders in the vertical spindle of a machine tool, and more particularly to improved apparatus for quickly and automatically changing tool holders in such spindle.

2. Description of the Prior Art

The improved tool changer is adapted for use with a machine tool having a spindle rotatable about a vertical axis. The spindle of such machine tool is adapted to selectively engage and hold any of a plurality of tool holders. One example of such machine tool, spindle and tool holder, is shown and described in U.S. Pat. No. 3,722,363. Another spindle construction is shown and described in U.S. Pat. No. 3,678,801. It should be clearly understood that such machine tool, spindle, and tool holder, per se, form no part of present invention except insofar as the improved tool changer may be used therewith.

Others have developed tool changers for use with such a machine tool, and examples of such known forms of tool changers having a carousel-type tool storage magazine rotatable about a vertical axis, may be shown in one or more of the following U.S. Pat. Nos. 3,722,363; 3,074,147; 2,901,927; 3,452,427; 3,526,033; 3,200,492; 3,662,442; and 3,932,924.

However, many of these prior art devices provide structure which is either unduly complex for some machining operations, or which involve the presence of an intermediate transfer arm between the tool storage magazine and spindle.

SUMMARY OF THE INVENTION

The present invention provides an improved tool changer which is adapted to be mounted on a machine tool having a spindle rotatable about a vertical axis.

Briefly, the improved tool changer includes: a rail adapted to be mounted on the machine tool and having one end arranged adjacent to and in radial alignment with the spindle axis; a carriage mounted for movement along the rail toward and away from the spindle axis; a carousel-type tool storage magazine mounted on the carriage for movement therewith and also mounted on the carriage for rotational movement about a vertical axis; rotational means selectively operable to suitably rotate or index the carousel to vertically align a tool holder with the spindle axis; and carriage moving means selectively operable to move the carriage between a retracted position remote from the spindle axis and an extended position adjacent the spindle axis. The carousel includes a plurality of hands spaced thereabout, and each of these hands is mounted on the carousel for vertical movement between a lowered position and a raised position. Each hand supports a cooperative pair of fingers extending outwardly from the carousel, which fingers are adapted to embrace and releasably hold a tool holder therebetween. The carousel also includes lifting means selectively operable to elevate any one of the hands which is radially aligned with the spindle axis from its lowered position to its raised position. The fingers of any such hand which is radially aligned with the spindle axis may be moved to a position at which such fingers are adapted to embrace a tool holder in vertical alignment with the spindle axis when the carriage is in its extended position.

In use, the inventive tool holder performs a method of changing a tool holder held by a spindle, which method comprises the following sequential steps: raising a cooperative first pair of empty fingers to the level of a first tool holder held by the spindle; advancing the carousel radially toward the spindle axis to an extended position at which such empty pair of first fingers will embrace and releasably hold the first tool holder; lowering the first fingers to withdraw the first tool holder from the spindle; rotating the carousel to vertically align a second tool holder embraced by a second cooperative pair of fingers with the spindle axis; raising the second pair of fingers to insert the second tool holder into the spindle; withdrawing the carousel radially from the spindle axis to a retracted position to disengage the second pair of fingers from the second tool holder; and lowering the empty second pair of fingers in such retracted position.

Accordingly, one general object of the present invention is to provide an improved tool changer which is adapted to be mounted on a machine tool to change tool holders engagable with a spindle.

Another general object is to provide such an improved tool changer which obviates the need for an intermediate transfer arm between the spindle axis and a rotatable carousel-type tool storage magazine.

Another object is to provide such an improved tool changer wherein the entire tool storage magazine may be selectively translated toward and away from the spindle axis.

Still another object is to provide an improved tool changer which is simplified in structure and operation, and which is less costly to manufacture.

These and other objects and advantages will become apparent from the foregoing and ongoing specification, the drawings, and the appended claims.

DESCRIPTION OF THE PREFERRED EMBODIMENTS

Figure 1:
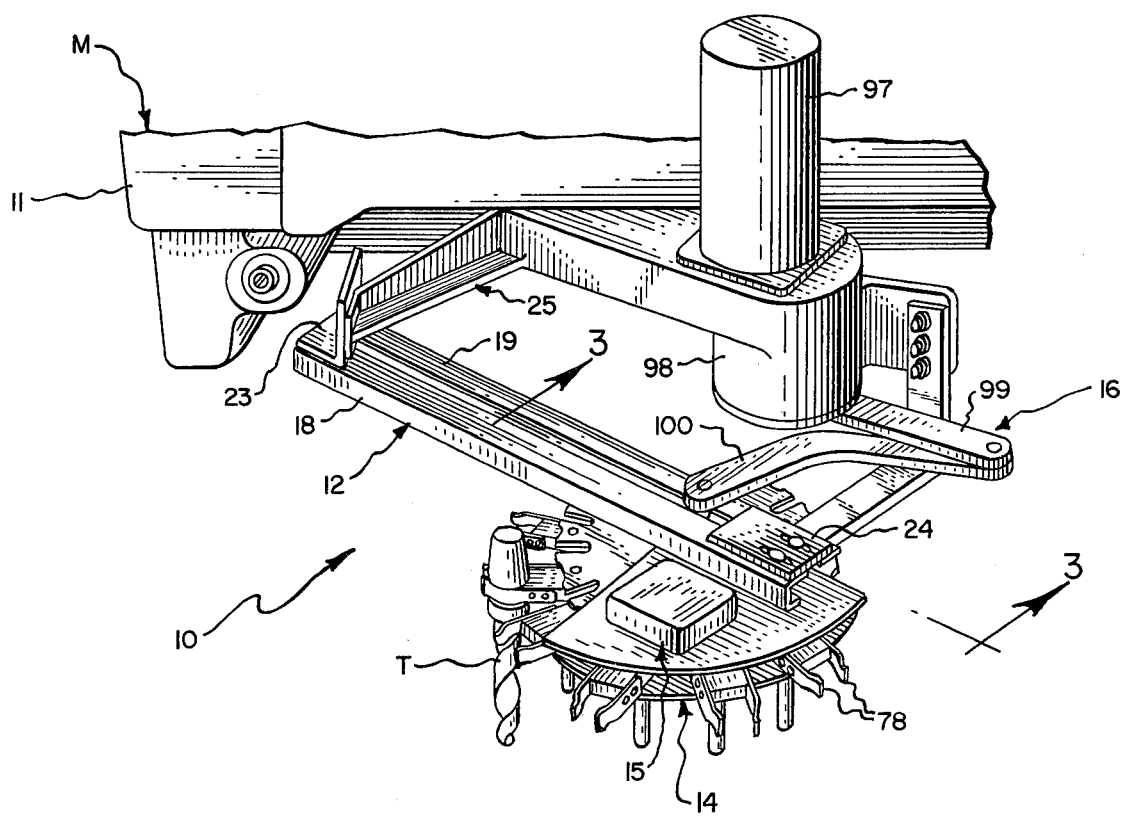
FIG. 1 is a perspective view of the improved tool changer mounted on a machine tool, this view showing the carousel in its retracted position remote from the spindle axis of such machine tool.

At the outset, it should be clearly understood that like reference numerals are intended to identify the same elements and/or structure consistently throughout the several drawing figures, as such elements and/or structure may be further described or explained by the entire written specification of which this detailed description is an integral part.

Figure 2:
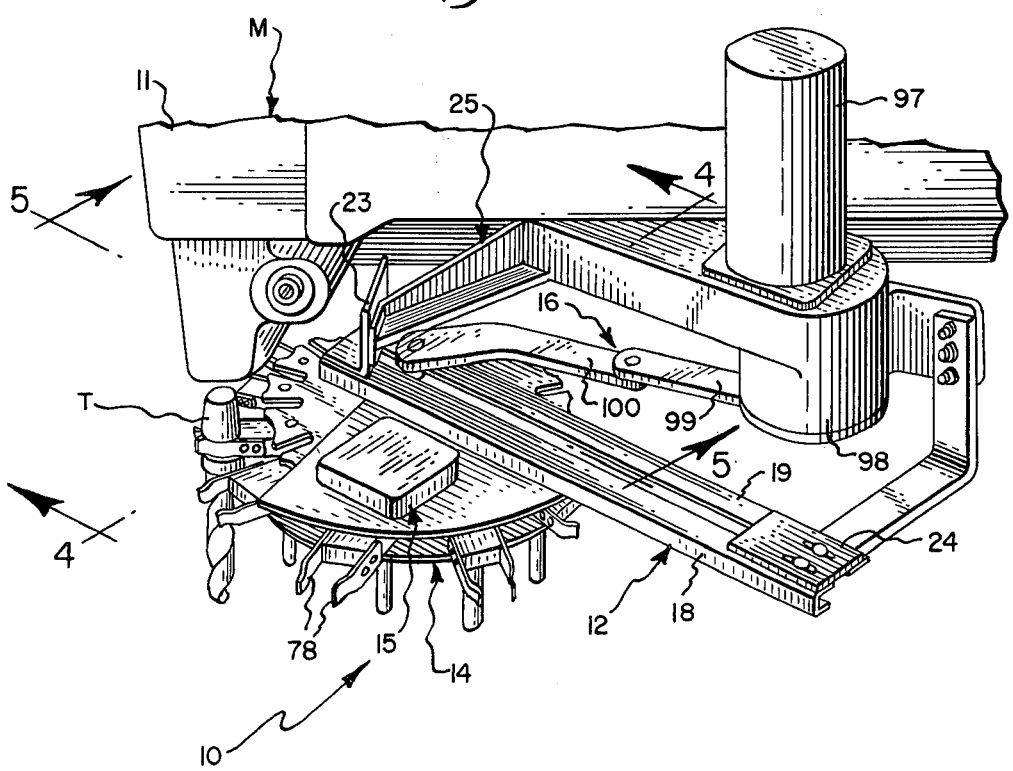
FIG. 2 is a perspective view of the improved tool changer, this view being similar to FIG. 1 but showing the carousel as having been translated along the rail to its extended position adjacent the machine tool spindle.

Referring now collectively to the various drawing figures, and more particularly to FIGS. 1 and 2 thereof, the present invention broadly provides an improved tool changer, of which the presently preferred embodiment is generally indicated at 10, which is adapted to be mounted on a machine tool, generally indicated at M. This machine tool M may be of any suitable type, but is specifically illustrated as being a vertical milling machine having a spindle, generally indicated at S (FIG. 5), rotatable about a vertical axis. While the machine tool M is fragmentarily shown as including a head structure 11 within which spindle S is suitably journalled, a more complete description of this type of machine tool may be found in U.S. Pat. No. 3,722,363, the aggregate disclosure of which is hereby incorporated by reference. However, this machine tool M forms no part of the present invention, save only that the improved tool changer 10 is adapted for use therewith. Moreover, the spindle of such machine tool also forms no part of the present invention, and the structure and operation of such spindle is more fully shown and described in the aforesaid U.S. Pat. No. 3,722,363, and in U.S. Pat. No. 3,678,801. Accordingly, the aggregate disclosures of both of these patents are hereby incorporated by reference to amplify the structure and operation of spindle S.

Adverting now principally to FIG. 1, the preferred embodiment of tool changer 10 broadly includes: a rail, generally indicated at 12; a carriage, generally indicated at 13 (FIGS. 4 and 5), mounted for movement along the rail toward and away from the vertical spindle axis; a carousel-type tool storage magazine, hereinafter termed a "carousel" and generally indicated at 14, mounted on the carriage for movement therewith and also mounted for rotational movement about a vertical axis; rotational means, generally indicated at 15, selectively operable to rotate the carousel and carriage moving means, generally indicated at 16, selectively operable to move the carriage between a retracted position (FIG. 1) remote from the spindle axis, and an extended position (FIG. 2) adjacent the spindle axis.

Rail 12

Referring now to FIGS. 1-5, the rail 12 is depicted as including horizontally-elongated parallel left and right sections 18, 19, spaced transversely from and arranged to face one another. Each of these rail sections appears to be channel-shaped, when viewed in transverse cross-section (FIG. 4), and has upper and lower horizontal flanges 20, 21 separated by an intermediate vertical web 22. Thus, the upper flanges 20, 20 of rail sections 18, 19 are spaced transversely from one another to define a longitudinally-elongated horizontal upper slot therebetween, and the lower flanges 21, 21 of rail sections 18, 19 are also spaced transversely from one another to define a longitudinally-elongated horizontal lower slot. These left and right rail sections 18, 19 are secured by means of suitable fasteners to a bracket 23 at their front marginal end portions proximate the spindle axis, and to a bracket 24 at their rear marginal end portions remote from the spindle axis. These two rail-supporting brackets 23, 24 are secured to machine tool M by means of a suitable frame, collectively indicated at 25. This frame 25 holds the rail sections 18, 19 such that the horizontal longitudinal axis of the rail intersects the vertical axis of the spindle.

Carriage 13

Figure 3:
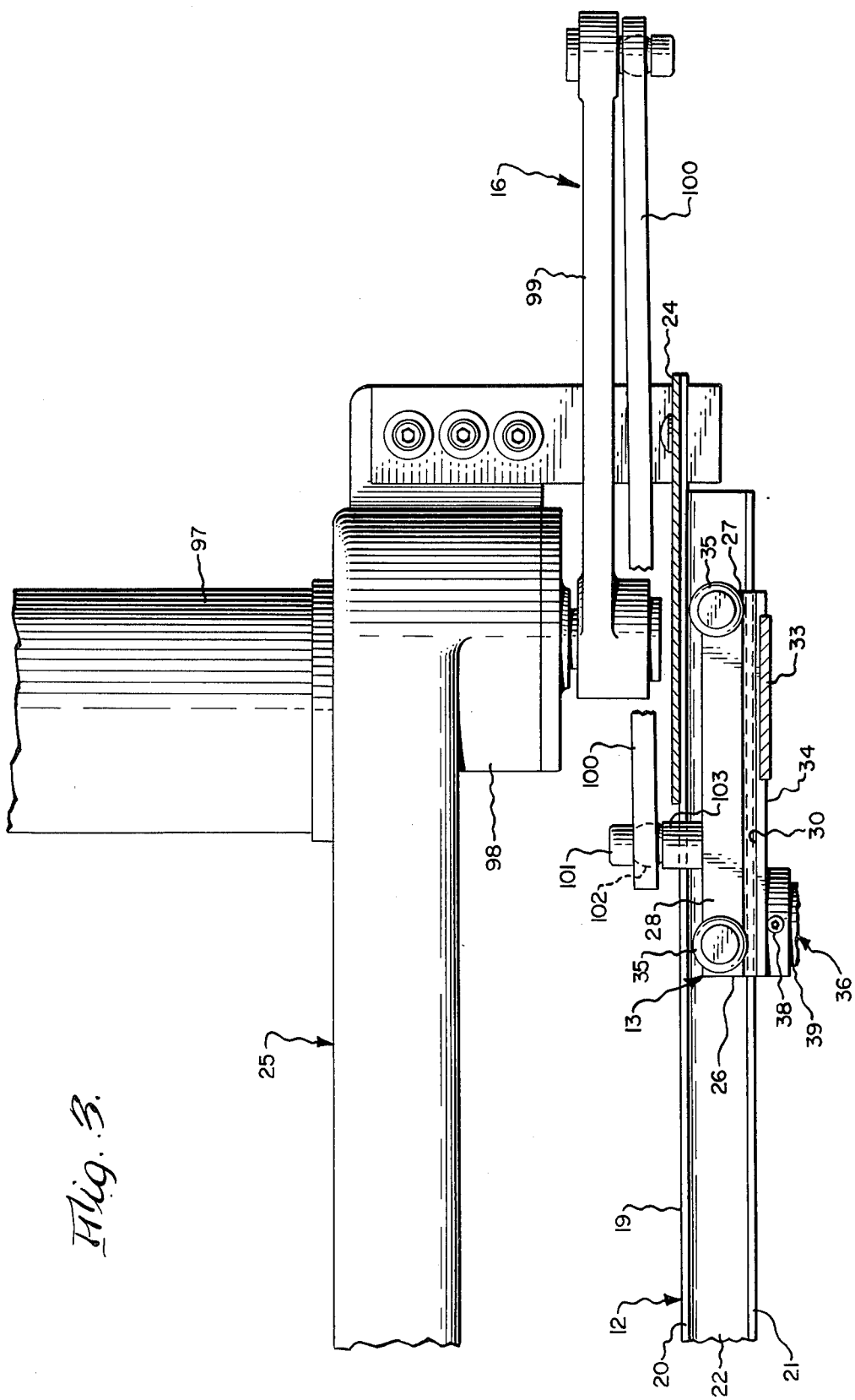
FIG. 3 is an enlarged fragmentary vertical sectional view thereof, taken generally on line 3—3 of FIG. 1, this view principally showing the motor, the slip clutch, the two arms, and the carriage.
Figure 4:
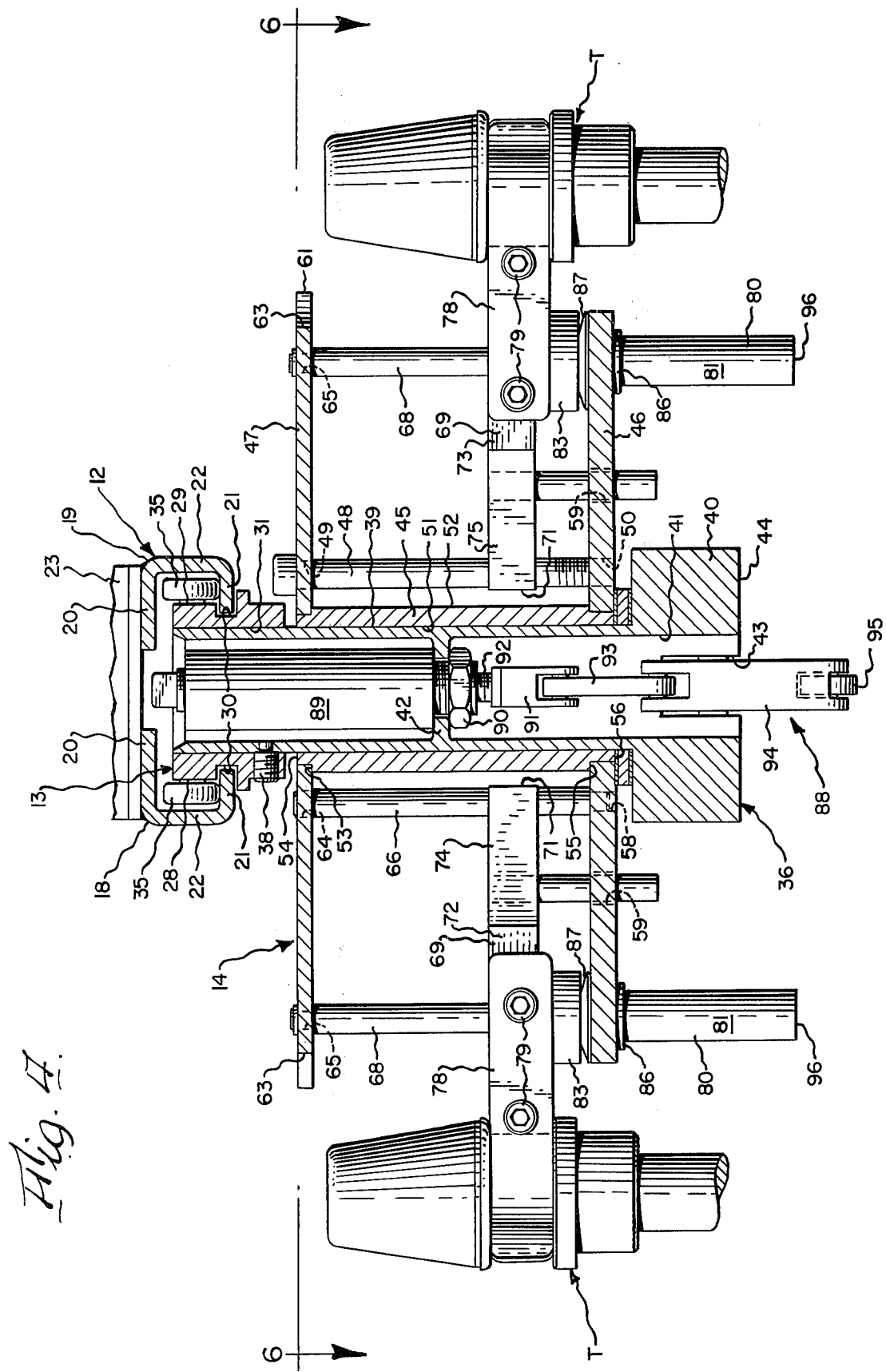
FIG. 4 is an enlarged fragmentary vertical sectional view thereof, taken generally on line 4—4 of FIG. 2, this view showing the carousel, the carriage, and the rail in transverse cross-section.
Figure 5:
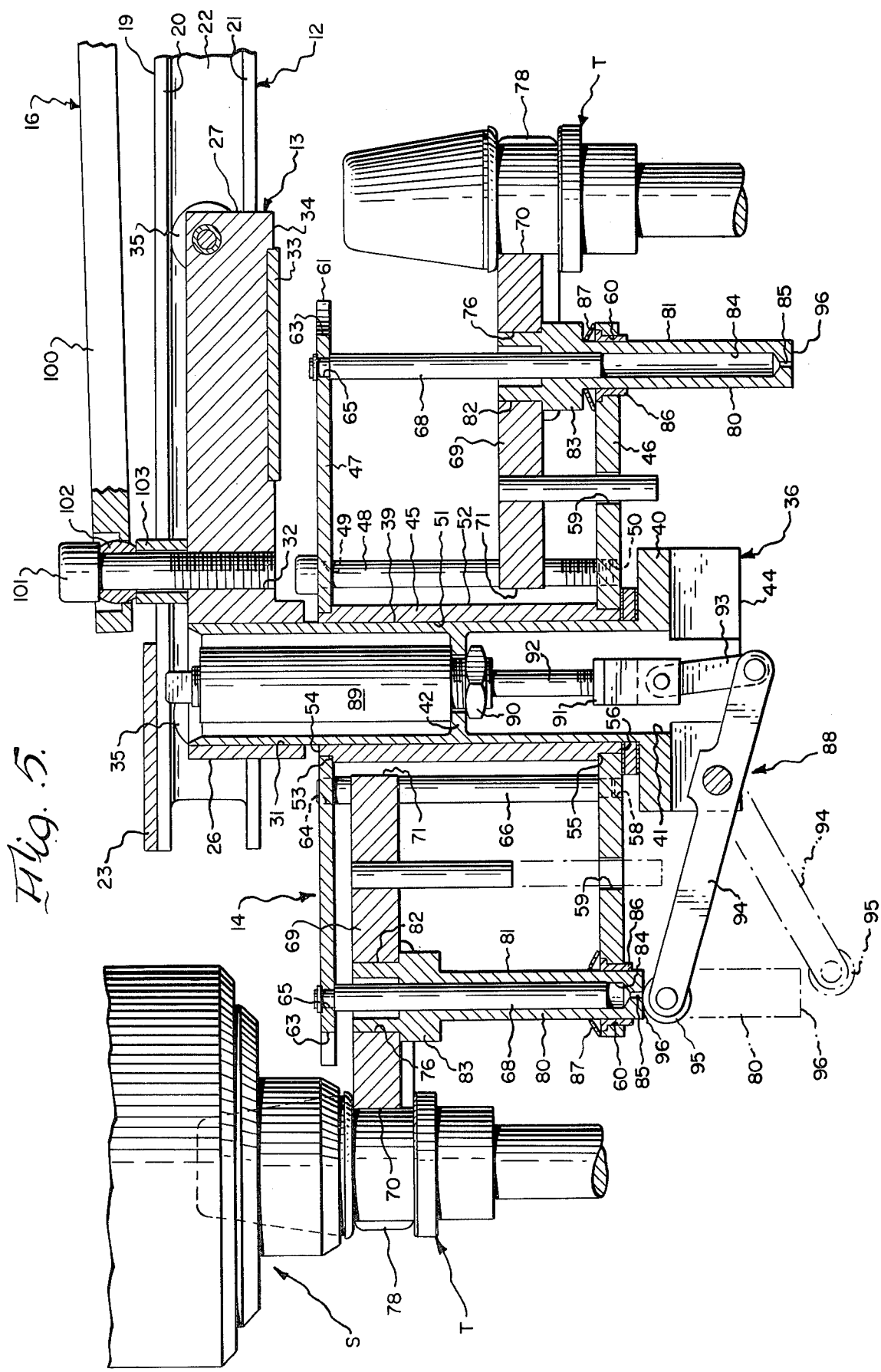
FIG. 5 is an enlarged fragmentary vertical sectional view thereof, taken generally on line 5—5 of FIG. 2, showing the carousel, the carriage and the rail in longitudinal cross-section.

Referring now to FIGS. 3-5, the carriage 13 includes an elongated substantially rectangular solid block-like member having transverse planar vertical front and rear surfaces 26, 27 (FIGS. 3 and 5), and longitudinal planar vertical left and right side surfaces 28, 29 (FIG. 4). As best shown in FIG. 4, this block-like member is provided with a longitudinally-extending horizontal groove 30 extending into the block-like member from each of the side surfaces 28, 29 thereof, to receive the rail lower flanges 21, 21. This block-like member is shown as being vertically thickened proximate its front end, and such thickened portion is provided with a vertical through hole 31. Slightly to the rear of hole 31, the block-like member is provided with a transversely-centered tapped hole 32 for a purpose hereinafter explained. Toward its rear end, the blocklike member is depicted in FIG. 5 as including a horizontal plate 33 attached to its bottom surface 34. This plate 33 supports the indexing means 15 hereinafter described. Moreover, four freely rotatable rollers 35 are shown as being suitably journalled on the block-like member and as extending laterally outwardly therefrom to rest upon the rail lower flanges 21, 21. In this manner, the carriage is mounted for movement along the rail toward and away from the spindle axis.

As best shown in FIGS. 4 and 5, the upper marginal end portion of a carousel hub retainer, generally indicated at 36, is received on carriage hole 31 and is suitably secured to the carriage block-like member, as by means of fastener 38. This hub retainer 36 is illustrated as being a vertically-elongated substantially tubular member having a cylindrical outer surface 39 generated about a vertical axis of revolution, a lower horizontally thickened portion 40, and a cylindrical inner surface 41. As best shown in FIG. 4, a horizontal annular plate-like shoulder 42 extends radially inwardly from the hub retainer inner surface 41 at an intermediate point of its vertical extent, for a purpose hereinafter explained. The lower thickened portion 40 of this hub retainer is shown provided with a horizontally-elongated rectangular through slot 43 (FIG. 4) which extends upwardly into the hub retainer from its lowermost horizontal planar bottom surface 44.

Carousel 14

As previously noted, carousel 14 is a rotatable tool storage magazine, simply denominated a "carousel" herein for ease in description.

Figure 6:
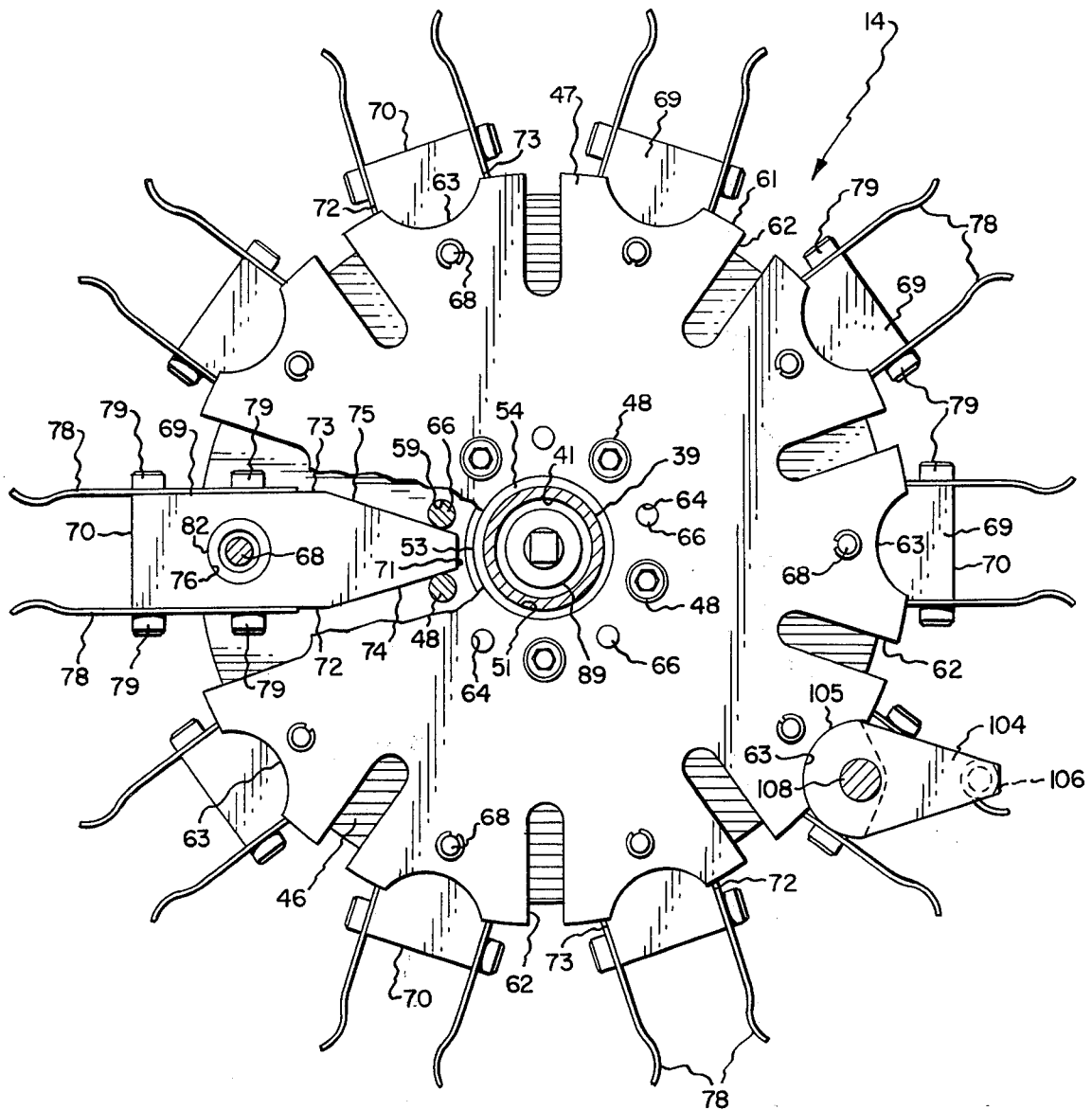
FIG. 6 is a fragmentary horizontal sectional view thereof, taken generally on line 6—6 of FIG. 4, this view showing a top plan view of the Geneva wheel, and having a portion thereof broken away to reveal a top plan view of one of the hands.

Referring now to FIGS. 4–6, this carousel is shown as including a central vertical hub 45 rotatably mounted on hub retainer 36; a lower horizontal annular plate-like base member 46; an upper horizontal annular plate-like Geneva wheel 47 spaced vertically above base member 46; a plurality of bolt fasteners, severally indicated at 48, arranged in a bolt circle about the hub 45 and having their upper head portions arranged to engage the upper horizontal surface of Geneva wheel 47, having their vertically-elongated shank portions arranged to penetrate a corresponding plurality of holes 49 provided through Geneva wheel 47, and having their threaded lower marginal end portions matingly received in a corresponding plurality of tapped holes 50 provided in the base member. As best shown in FIG. 6, five of these bolt fasteners 48 surround the carousel hub 45 and secure the upper and lower plate-like members 47, 46 thereto.

The carousel hub 45 is illustrated as being a vertically-elongated cylindrical tubular member having an inner cylindrical surface 51 arranged to face the outer cylindrical surface 39 of the hub retainer, and having an outer cylindrical surface 52 provided with an annular upper notch 53 communicating with the horizontal annular upper end face 54 of the hub and also provided with an annular lower notch 55 communicating with the horizontal annular lower end face 56 of the hub. Persons skilled in this art will readily recognize that bolt fasteners 48 may be suitably tightened to draw the upper and lower plate-like members 47, 46 toward one another, and into tight engagement with the carousel hub 45.

The annular plate-like base member 46 is depicted as having a large plurality of vertical through holes arranged in three separate concentric bolt circles. The innermost bolt circle includes the plurality of tapped holes 50 which are adapted to receive the threaded lower marginal end portions of bolt fasteners 48, and also includes another plurality of holes 58 severally arranged between any two adjacent tapped holes 50. Thus, as one proceeds around the inner bolt circle, an alternating series of equally-spaced tapped holes 50 and holes 58 is encountered. The preferred embodiment is specifically illustrated as including five of tapped holes 50, and five of holes 58. Therefore, the vertical centerline of any of holes 58 would be spaced by an arc inscribing an angle of 36 degrees from the vertical centerline of its adjacent holes 50, and visa versa. The diameter of the intermediate bolt circle is greater than the diameter of the inner bolt circle, and this intermediate bolt circle includes a plurality of holes 59. In the preferred embodiment, the intermediate bolt circle includes ten of holes 59, and these holes are spaced equally from one another by an arc inscribed by an angle of 36 degrees. The diameter of the outer bolt circle is greater than the diameter of the intermediate bolt circle, and this outer bolt circle includes a plurality of holes 60. Here again, the preferred embodiment includes ten of holes 60, and these holes are also spaced equally from one another by an arc inscribed by an angle of 36 degrees.

Referring now to FIGS. 4–6, the Geneva wheel 47 is shown as being a plate-like member having a cylindrical outer peripheral surface 61, and provided with an alternating series of slots 62 and concave surfaces 63 extending radially into member 47 from its peripheral surface 61. The preferred embodiment is specifically illustrated as having ten of slots 62, and ten of concave surfaces 63. This Geneva wheel 47 is also depicted as including a plurality of vertical through holes arranged in two concentric bolt circles. The inner bolt circle includes a plurality of holes 49 designed to accommodate passage of the shank portions of bolt fasteners 48, and also includes a plurality of holes 64. Thus, in the preferred embodiment, the inner bolt circle includes five of holes 49 and five of holes 64, these being arranged such that as one proceeds around the inner bolt circle, an alternating series of holes 49 and holes 64 is encountered. Of course, the inner bolt circle of the Geneva wheel 47 is of the same diameter as the inner bolt circle of the base member 46, and these two plate-like members may be arranged such that Geneva wheel holes 49 and 64 will be vertically aligned with base member holes 50 and 58, respectively. The outer bolt circle of the Geneva member includes a plurality of holes 65, ten of these being shown in FIG. 6. Of course, the diameter of the Geneva member outer bolt circle is the same as the diameter of the base member outer bolt circle, and Geneva wheel holes 65 are arranged to be vertically aligned with base member holes 60 when Geneva wheel holes 49, 64 are vertically aligned with base member holes 50, 58, respectively.

The carousel further includes a plurality of cylindrical spacer rods, severally indicated at 66, having their upper and lower marginal end portions received in Geneva plate holes 64, and base plate holes 58, respectively. Of course, these spacer rods 66 are suitably retained in this position, as by means of shoulders on rods 66 and engageable with members 46, 47. A plurality of cylindrical guide rods, severally indicated at 68, are disposed between the plate members 46, 47 such that their upper marginal end portions are received in Geneva wheel holes 65, and their lower marginal end portions are received in base plate holes 60. Here again, these guide rods are suitably retained in this position, as by retaining rings or the like. The preferred embodiment is specifically illustrated as including five of spacer rods 66, and ten of guide rods 68.

The carousel also includes a plurality of hands, severally indicated at 69, spaced thereabout and mounted on the carousel for vertical movement between a lowered position and a raised position. In FIG. 5, the left hand is depicted as being in the raised position, and the right hand is depicted as being in such lowered position. As best shown in FIGS. 4-6, each of hands 69 is a solid thickened horizontally-elongated plate-like member having an outward body portion and a radially inward tapered nose portion arranged to penetrate the space between one of spacer rods 66 and the shank of one of bolt fasteners 48. As shown, the horizontal longitudinal axis of each hand radially intersects the vertical axis of the hub. Specifically, each hand includes a transverse planar vertical outer surface 70, a transverse planar vertical inner surface 71, parallel left and right side surfaces 72, 73, and left and right inclined vertical surfaces 74, 75 joining the body portion side surfaces 72, 73 with the relatively narrow transverse inner surface. In this manner, each of hand surfaces 74, 75 is arranged to slidably engage one of bolt fasteners 48 and spacer rods 66. Each hand is further provided with a vertical through hole 76 in its body portion, and a pair of longitudinally-spaced tapped holes extending transversely into such hand from its left and right longitudinal side surfaces. A cooperative pair of fingers, severally indicated at 78, is shown as extending outwardly from each hand. The fingers of each cooperative pair are somewhat analogous to the thumb and forefinger of a human hand, and are adapted to embrace and releasably hold a tool holder, generally indicated at T, therebetween. Each of these fingers 78 is depicted as being a horizontally-elongated spring clip-like member having its inward portion arranged to contact one of hand side surfaces 72, 73, and having flexible portions extending longitudinally outwardly from the associated hand. As shown the outermost marginal end portion of each finger is curled inwardly toward the other finger of its cooperative pair, and thence outwardly to provide a guide surface facilitating the embrace of a tool holder. The inward portions of these fingers are secured to a hand by means of a pair of fasteners 79, and the cantilevered outer portions are flexible so as to snap into or out of engagement with a tool holder T.

Referring now to FIG. 5, each hand 69 is associated with a guide 80 and a guide rod 68. Each of guides 80 is shown as being a vertically-elongated tubular member having a lower outer cylindrical surface 81, an upper outer cylindrical surface 82, and an intermediate annular collar 83, and a longitudinal vertical bore bounded by an inner cylindrical surface 84 extending downwardly into the guide from its upper horizontal annular surface, and communicating with its lower horizontal surface via a weep hole 85. Each guide 80 may be associated with a hand 69 and a guide rod 68 such that the guide rod cylindrical surface is arranged to face guide inner surface 84, guide outer surface 82 is arranged in hand hole 76, and guide outer surface 81 is arranged to face a low friction bushing 86 inserted into base member hole 60. A Belleville-type spring 87 is shown as being operatively positioned between each guide and the base member to cushion the descent of such guides. The guide is suitably secured in this position to the associated hand, such that the hand and guide are mounted on the carousel for vertical sliding movement along the associated guide rod. Thus, each hand may be selectively and independently moved vertically to its raised position, or to its lowered position.

Adverting now particularly to FIGS. 4 and 5, the carousel may further include lifting means, generally indicated at 88, selectively operable to elevate any one of hands 69 which is radially aligned with the spindle axis, from its lowered position to its raised position. This lifting means 88 includes an actuator 89 mounted within the carousel hub retainer by means of a nut 90 arranged to engage hub retainer shoulder 42; a clevis member 91 secured to the distal marginal end portion of the extensible actuator arm 92; a link 93 having one marginal end portion pivotally connected to the clevis member, and having its other marginal end portion pivotally connected to the inner marginal end portion of an intermediately-pivoted lever 94 having an idler roller 95 mounted on its outer marginal end portion to engage the lower horizontal bottom surface 96 of any of guides 80. In other words, when the actuator arm is retracted, as shown in FIG. 4 and as shown in phantom in FIG. 5, the roller 95 is in a lowered position disengaged from the guide. With the lifting means in 88 in this lowered, disengaged position, the carousel may be rotated or rotatably indexed as desired, to radially align any one of the hands 69 with the spindle axis. After the desired hand has been so aligned, the actuator 89 may be selectively operated to pivot the lever 84 and cause the roller 95 to engage and lift the aligned guide from its lowered position to its raised position.

Carriage Moving Means 16

Referring now to FIGS. 1-3 and 5, the carriage moving means 16 includes a motor 97 mounted on the rail frame 25 and having a rotatable output shaft (not shown); a slip clutch (not shown) operatively connected to the motor output shaft and contained within a housing 98; a first arm 99 having one marginal end portion connected to the output shaft of the slip clutch and having its other marginal end portion pivotally connected to one marginal end portion of a boomerang-shaped second arm 100. As best shown in FIG. 5, the other marginal end portion of this second arm is pivotally connected to the carriage by means of a bolt fastener 101 having its shank portion arranged to penetrate a universal joint 102 and a collar 103, and having its threaded marginal end portion matingly received in tapped carriage hole 32. Therefore, the motor 97 may be suitably operated to impart rotary motion in the slip clutch to first arm 99, which in turn transmits linear motion to the carriage via second arm 100. By such operation of the carriage moving means, the carriage may be moved to either its retracted position, as shown in FIG. 1, or to its extended position, as shown in FIG. 2.

Rotational Means 15

The rotational means 15 is selectively operable to rotate the carousel to cause another hand to move into a position radially aligned with the spindle axis. As best shown in FIG. 6, the rotational means is of the indexing type and includes a Geneva driver 104 mounted for rotation about a vertical axis and having a concentric vertical cylindrically-segmented surface 105 and a pin 106. Thus, as shaft 108 is rotated, the Geneva driver convex surface 105 is caused to slide past the Geneva wheel concave surfaces 63, and the Geneva driver pin 106 is caused to progressively enter and withdraw from Geneva wheel slots 62 to rotatably index the carousel about the axis of its hub. Thus, persons skilled in this art will appreciate that shaft 108 may be selectively rotated to impart intermittent rotary or indexing motion to the carousel. The aim, of course, is to suitably index the carousel such that the hands may move sequentially into radial alignment with the spindle axis. This Geneva driver is mounted on carriage plate 33, as shown in FIG. 5.

Operation

Figure 7:
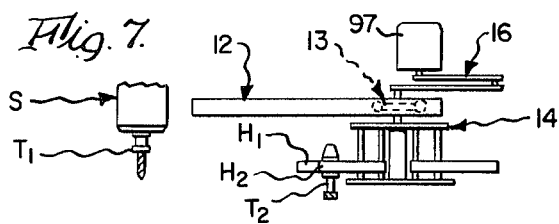
FIG. 7 is a schematic elevational view showing the carousel in its retracted position, and showing the empty fingers of a spindle-aligned hand in their lowered position.
Figure 8:
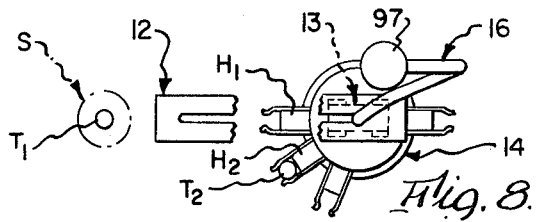
FIG. 8 is a schematic top plan view of FIG. 7.
Figure 9:
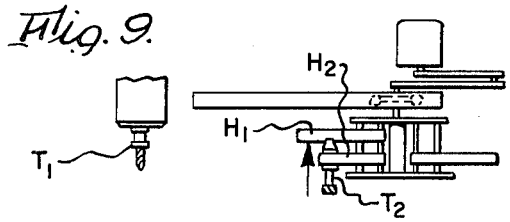
FIG. 9 is a schematic elevational view showing the carousel in its retracted position, but showing the spindle-aligned hand as having been lifted to its raised position.
Figure 10:
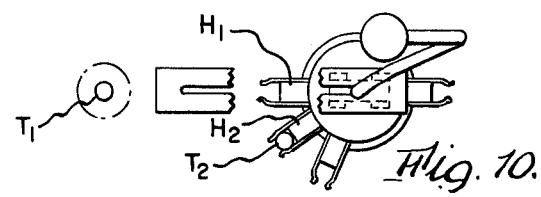
FIG. 10 is a schematic top plan view of FIG. 9.

The operation of the inventive tool changer 10 is schematically depicted in FIGS. 7-22, it being appreciated that FIG. 8 is a top plan view of the structure shown in FIG. 7, FIG. 10 is a top plan view of the structure shown in FIG. 9, and so on.

Referring initially to FIG. 7, the spindle is shown as holding a tool holder $T_1$, the carriage is in the retracted position, and the empty fingers of hand $H_1$ are aligned with the spindle.

To change tool holders, the actuator is first operated to lift hand $H_1$ to its raised position, this being shown in FIGS. 9 and 10.

Figure 11:
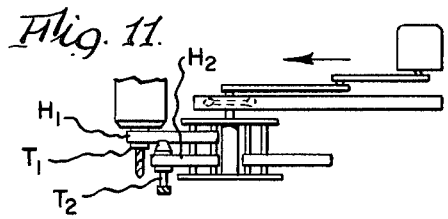
FIG. 11 is a schematic elevational view showing the carousel as having been moved toward the spindle axis such that the fingers of the raised spindle-aligned hand embrace the tool holder held by the spindle.
Figure 12:
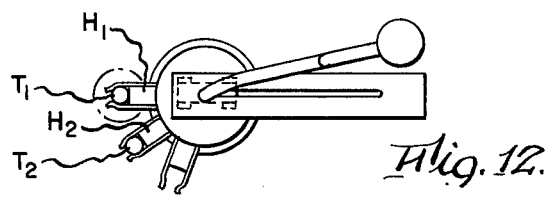
FIG. 12 is a schematic top plan view of FIG. 11.

With hand $H_1$ in such raised position, the carriage moving motor is operated to translate the carriage from its retracted position to its extended position, as shown in FIGS. 11 and 12. In the extended position, the fingers of hand $H_1$ will embrace tool holder $T_1$.

Figure 13:
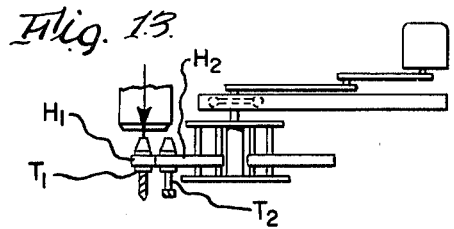
FIG. 13 is a schematic elevational view showing the spindle-aligned hand as having been moved to its lowered position to withdraw the tool holder from the spindle.
Figure 14:
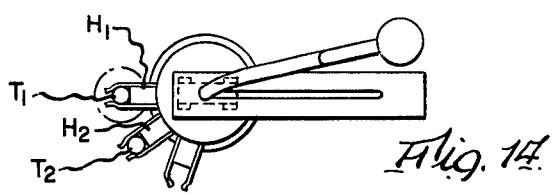
FIG. 14 is a schematic top plan view of FIG. 13.

Thereafter, a tool holder eject mechanism (not shown) within the spindle is operated to release tool holder $T_1$, and the actuator is deactivated to allow hand $H_1$ carrying tool holder $T_1$ to fall of its own weight to the lowered position, as shown in FIGS. 13 and 14.

Figure 15:
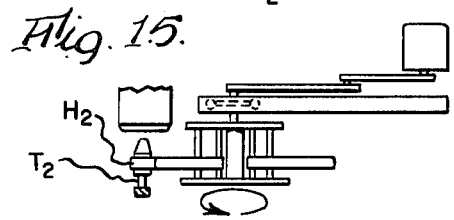
FIG. 15 is a schematic elevational view showing the carousel as having been rotatably indexed in its extended position to vertically align a second tool holder with the spindle axis.
Figure 16:
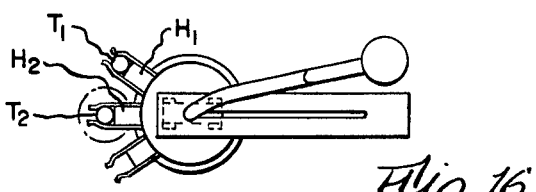
FIG. 16 is a schematic top plan view of FIG. 15.

With hand $H_1$ and tool holder $T_1$ in such lowered position, the Geneva driver is operated to rotate the carousel such that tool holder $T_2$, carried by sequential hand $H_2$, will be vertically aligned with the spindle, as shown in FIGS. 15 and 16.

Figure 17:
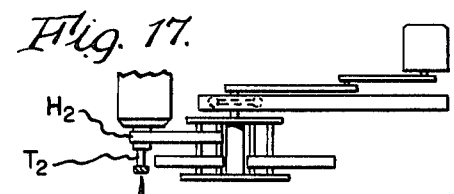
FIG. 17 is a schematic elevational view showing the newly-aligned tool holder as having been lifted to its raised position to insert such tool holder into the spindle.
Figure 18:
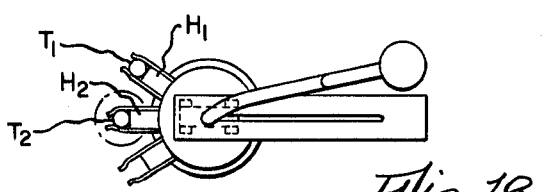
FIG. 18 is a schematic top plan view of FIG. 17.

With tool holder $T_2$ so aligned, the actuator is again operated to lift hand $H_2$ to its raised position, thereby inserting tool holder $T_2$ into the spindle, this step being shown in FIGS. 17 and 18.

Figure 19:
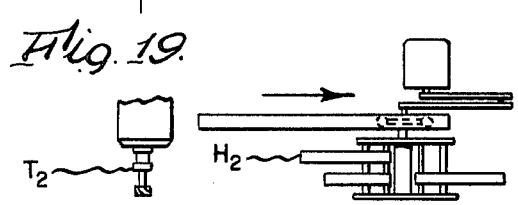
FIG. 19 is a schematic elevational view showing the carousel as having been moved away from the spindle to its retracted position with the empty fingers of the spindle-aligned hand in their raised position.
Figure 20:
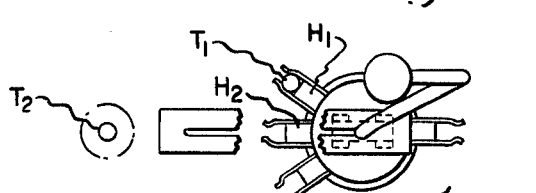
FIG. 20 is a schematic top plan view of FIG. 19.
Figure 21:
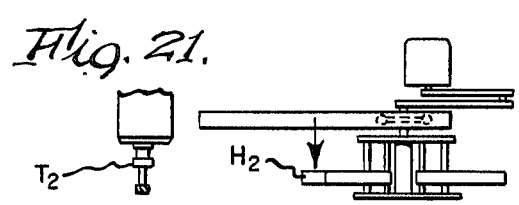
FIG. 21 is a schematic elevational view showing such raised spindle-aligned hand as having been moved to its lowered position with the carousel in its retracted position.
Figure 22:
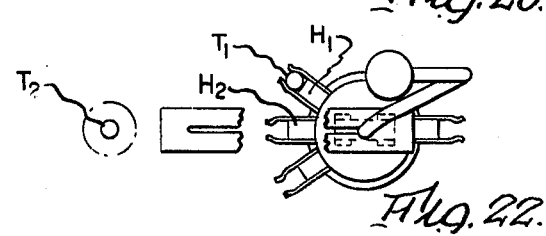
FIG. 22 is a schematic top plan view of FIG. 21.

Thereafter, a tool holder engaging mechanism (not shown) within the spindle is operated to engage tool holder $T_2$, and the carousel is translated away from the spindle to its retracted position, as shown in FIGS. 19-20.

Finally, with the carriage in its retracted position, the actuator is deenergized to allow hand $H_2$ to fall by gravity to its lowered position.

In this manner, the inventive tool changer 10 may be operated to change a tool holder held by a spindle.

Persons skilled in this art will appreciate that the preferred embodiment may be modified without significantly changing the function or operation of the disclosed tool changer. Thus, while the preferred embodiment of the carriage moving means 16 includes motor 97, slip clutch 98, and arms 99 and 100, it is apparent that other kinematic mechanisms may be substituted therefor, while preserving the functional capability of translating the carriage toward and away from the spindle axis. Such other kinematic mechanisms, too numerous to mention here, are expressly contemplated by the present invention and fall within the scope of the "carriage moving means", as used herein. The rail 12 need not be of the exact construction herein described, but may assume other shapes and configurations as well. Indeed, the rail need not necessarily be linear, as shown, and may have some other non-linear shape, so long as the fingers on each hand may be caused to selectively embrace or release a tool holder vertically aligned with the spindle axis. The actuator 89 may be either of the hydraulic, pneumatic or electrical type, and the lever linkage through which such actuator produces vertical movement of a guide, need not be identical to the specific mechanism herein disclosed. Thus, the actuator may act on such guide through other intermediate mechanisms, or directly, as desired. Of course, the tool changer may have any number of hands and fingers as may be practical, notwithstanding that the preferred embodiment is illustrated as having ten of such hands. Likewise, the hands are not limited to the specific construction shown, and the fingers may be more complicated jaw-like members, again as desired. As used in the appended claims, the term "rotational means" should not be limited to a Geneva mechanism, but should be construed broadly to include any mechanism capable of causing rotational movement, and preferably intermittent rotational movement, of the carousel.

Moreover, the operation of the inventive tool changer may be automated through use of an electrical circuit including a plurality of microswitches (not shown). These microswitches may be suitably placed to sense, for example, when the carriage is in its retracted or extended position, when a hand is in its raised or lowered position, and when the carousel has been rotated to align the sequential hand with the spindle axis. Thus, each hand is illustrated as carrying an unnumbered depending pin operatively arranged to penetrate a hole 59 in the base member 46. These pins may be used to operate a microswitch to indicate that such hand is in its lowered position. However, the provision of such pins, if desired, and the electrical circuitry by which the operation of the inventive tool may be automated, are considered as being matters well within the ambit of a person skilled in this art, and are not more fully disclosed herein.

Therefore, while the preferred species embodiment of the present invention has been shown and described, persons skilled in this art will understand that various changes and modifications, not limited to those described above, may be made without departing from the spirit of the invention which is generally defined by the following claims.

What is claimed is:

1. A tool changer adapted to be mounted on a machine tool having a spindle rotatable about a vertical axis, said tool changer comprising: a frame a carriage mounted on said frame for movement toward and away from said spindle axis, said carriage including a tubular hub retainer having an external cylindrical surface;

a carousel mounted on said carriage for movement therewith and also mounted for rotational movement about a vertical axis, said carousel including a hub having an internal cylindrical surface arranged to face said hub retainer cylindrical surface and including a plurality of hands spaced thereabout, each of said hands being mounted on said carousel for vertical movement between a lowered position and a raised position, each of said hands supporting a cooperative pair of fingers extending outwardly from said carousel and adapted to releasably hold a tool holder therebetween, said carousel also including lifting means having a lever pivotally mounted on said hub retainer for pivotal movement in a vertical plane including said spindle axis and having an actuator mounted on said hub retainer and selectively operable to cause said lever to elevate any one of said hands which is aligned with said spindle axis from said lowered position to said raised position;

rotational means selectively operable to rotate said carousel to cause another one of said hands to move to such angular position aligned with said spindle axis; and carriage moving means selectively operable to move said carriage between a retracted position remote from said spindle axis and an extended position adjacent said spindle axis, the fingers of such hand which is aligned with said spindle axis being moved to a position at which such fingers are adapted to embrace a tool holder in vertical alignment with said spindle axis when said carriage is in said extended position.

2. A tool changer as set forth in claim 1 wherein said carousel includes two plate-like members spaced vertically from one another, and a central hub joining said plate-like members.

3. A tool changer as set forth in claim 1 wherein said carousel includes a plurality of vertical guide rods and guide members, one of said guide rods and guide members being associated with one of said hands, each of said guide members being mounted on the associated hand for vertical sliding movement along the associated guide rod.

4. A tool changer as set forth in claim 1 and further comprising:

a rail having means for being mounted on said machine tool, paid rail having one marginal end portion being located adjacent to and in radial alignment with said spindle axis.

5. A tool changer as set forth in claim 4 wherein said carriage moving means includes a motor having a rotatable output shaft, and linkage means associated with said carriage and said output shaft for causing said carriage to move along said rail in response to rotation of said output shaft.

6. A tool changer as set forth in claim 5 wherein said linkage means includes a first arm secured to said output shaft and having a distal end portion, and a second arm having one end portion pivotally connected to said first arn end portion and having another end portion pivotally connected to said carriage.

7. In a tool changer adapted to be mounted on a machine tool having a spindle rotatable about an axis, said tool changer having a frame, a carriage mounted on said frame for movement toward and away from said spindle axis, and a tool storage magazine rotatably supported on said carriage and mounted for movement therewith, the improvement comprising:

carriage moving means operatively arranged to move said carriage between a retracted position remote from said spindle axis, and an extended position adjacent said spindle axis, said carriage moving means including motor means mounted on said frame and having an output shaft arranged to be rotated between two angular positions, a first arm having one marginal end portion fixed to said output shaft and having a distal marginal end portion, and a second arm having one marginal end portion freely pivotally connected to said first arm distal marginal end portion and having its other marginal end portion pivotally connected to said carriage, and rail means continuously guiding said other marginal end portion of said second arm along a path between said retracted and said extended positions from the spindle axis.

* * * * *